US005948719A

United States Patent [19]
Johnson et al.

[11] Patent Number: 5,948,719
[45] Date of Patent: Sep. 7, 1999

[54] RARE EARTH METAL ION EXCHANGED FERRIERITE

[75] Inventors: Jack W. Johnson, Clinton; Bruce R. Cook, Pittstown; Guang Cao, Branchburg, all of N.J.; Rich A. McEvoy, Upper Black Eddy, Pa.; Richard H. Ernst, Glen Gardner, N.J.

[73] Assignee: Exxon Research and Engineering Co., Florham Park, N.J.

[21] Appl. No.: 09/018,168

[22] Filed: Feb. 3, 1998

[51] Int. Cl.$^6$ ...................................................... B01J 21/00
[52] U.S. Cl. ................................ 502/73; 502/65; 502/66; 502/74; 423/DIG. 23
[58] Field of Search ................................ 502/65, 66, 71, 502/73, 74, 77; 423/DIG. 23

[56] References Cited

U.S. PATENT DOCUMENTS

| | | | |
|---|---|---|---|
| 3,140,249 | 7/1964 | Plank et al. | 208/120 |
| 3,140,251 | 7/1964 | Plank et al. | 208/120 |
| 3,140,253 | 7/1964 | Plank et al. | 208/120 |
| 4,251,499 | 2/1981 | Nanne et al. | 423/329 |
| 4,335,019 | 6/1982 | Bowes et al. | 252/450 |
| 4,343,692 | 8/1982 | Winquist | 208/111 |
| 4,584,286 | 4/1986 | Valyocsik | 502/62 |
| 4,795,623 | 1/1989 | Evans | 423/328 |
| 5,256,828 | 10/1993 | Cuscurida et al. | 568/620 |
| 5,288,475 | 2/1994 | Chang et al. | 423/706 |

*Primary Examiner*—Michael Lewis
*Assistant Examiner*—Thomas G. Dunn, Jr.
*Attorney, Agent, or Firm*—Jay Simon

[57] ABSTRACT

Ferrierite is ion exchanged with trivalent rare earth metals by a hydrothermal ion exchange method. The ion exchange is carried out by contacting ferrierite, in which its cation exchange positions are occupied by hydrogen or a hydrogen precursor, with an aqueous solution of one or more rare earth metal cations at a temperature above the boiling point of the solution. After the ion exchange, preferably at least 10% and more preferably at least 15% of the ferrierite cation exchange capacity is occupied by a trivalent rare earth metal cation. When combined with a catalytic metal, such as a Group VIII noble metal, the trivalent rare earth metal ion exchanged ferrierite is useful as a dewaxing catalyst having good selectivity for lubricating oil fractions, particularly when dewaxing a Fischer-Tropsch wax hydroisomerate.

10 Claims, No Drawings

RARE EARTH METAL ION EXCHANGED FERRIERITE

BACKGROUND OF THE DISCLOSURE

1. Field of the Invention

The invention relates to a trivalent rare earth metal ion exchanged ferrierite. More particularly the invention relates to ferrierite containing one or more trivalent rare earth metals occupying at least 10% of its cation exchange capacity and to its preparation by hydrothermal ion exchange.

2. Background of the Invention

Ion exchangeable, natural and synthetic crystalline aluminosilicates of the zeolite type are well known and are useful as catalysts and molecular sieves. One such use comprises catalytically dewaxing waxy paraffinic feeds to reduce their pour point and convert the waxy material to useful products such as fuel and lubricating oil fractions, as is known. Such feeds have included petroleum derived wax containing oils, heavy oil fractions and slack wax. Dewaxing catalysts comprise a catalytic metal component, a natural or synthetic, crystalline aluminosilicate or zeolite molecular sieve component and often one or more additional refractory metal oxide components. Molecular sieves which have been found useful for dewaxing petroleum oil fractions and slack wax include, for example, ferrierite (U.S. Pat. Nos. 4,343,692 and 4,795,623), mordenite (U.S. Pat. No. 3,902,988), ZSM-23 and ZSM-35 (U.S. Pat. No. 4,222,855), ZSM-5 and ZSM-11 (U.S. Pat. No. 4,347,121) and ZSM-5 (U.S. Pat. No. 4,975,177). Both the '692 and '623 patents stress that it is the acid or H+ form of ferrierite which is active for dewaxing. The '623 patent discloses that ferrierite, when associated with particular catalytic metals, can also be useful as a catalyst for hydrocracking, isomerization, dealkylation and cracking. U.S. Pat. Nos. 4,584,286 and 5,288,475 relating to ZSM-35, a ferrierite-type of material, suggest it may be ion exchanged with hydrogen, a hydrogen precursor or a wide variety of metals, including rare earths, by the well known ion exchange technique of contacting the sieve with an aqueous salt solution of the metal at a temperature no greater than the boiling point of the solution, followed by washing.

SUMMARY OF THE INVENTION

It has been found that ferrierite can be ion exchanged with trivalent rare earth metal using a hydrothermal ion exchange method and that a dewaxing catalyst comprising the rare earth exchanged ferrierite exhibits better overall selectivity for producing lube oil fractions having a low pour point and a high VI than the hydrogen form of either ferrierite or mordenite. This is unexpected in view of the prior art. It has also been found that the well known and accepted prior art ion exchange method suggested in U.S. Pat. Nos. 4,584,286 and 5,288,475 is not effective for adding trivalent rare earth metals to the cation exchangeable positions in ferrierite, but that hydrothermal ion exchange is. Thus, one embodiment of the invention relates to a method for preparing trivalent rare earth metal ion exchanged ferrierite using hydrothermal ion exchange. Another embodiment comprises ferrierite in which one or more trivalent rare earth metals occupy at least 10%, more preferably at least 15% and still more preferably at least 25% of its cation exchange capacity. By rare earth metal is meant the lanthanide elements and includes La, Ce, Pr, Nd, Sm, Eu, Gd, Tb, Dy, Ho, Er, Tm, Yb, Lu, Y and mixtures thereof Hereinafter, in the context of the invention "RE-ferrierite" is meant to include either natural or synthetic ferrierite in which at least 10%, more preferably at least 15% and still more preferably at least 25% of the cation exchangeable capacity is occupied by one or more of these trivalent rare earth metal cations. This means that at least 10, 15 or 25% of the negative charge on the zeolite framework is balanced by trivalent rare earth metal cations. By hydrothermal ion exchange is meant contacting ferrierite with an aqueous solution of one or more rare earth metal salts at a temperature above the atmospheric pressure boiling point of the solution and for a time sufficient to achieve the desired level of exchange. The RE-ferrierite of the invention is useful as a catalyst. Typically, at least one catalytic metal component is added to the RE-ferrierite for catalytic purposes, with the specific metal or metals being determined by the intended use. For example, when used as a dewaxing catalyst, the catalytic metal component added to the RE-ferrierite will be at least one Group VIII metal and preferably at least one Group VIII noble metal. Further, the RE-ferrierite may be composited with other known catalytic components which are described in detail below. In catalytic dewaxing, a waxy hydrocarbonaceous feed is reacted with hydrogen in the presence of a dewaxing catalyst comprising the RE-ferrierite at conditions of temperature and pressure effective to reduce the pour point of the feed. A dewaxing catalyst comprising RE-ferrierite of the invention to which has been added a Group VIII noble metal has been found to be particularly effective for producing high yields of dewaxed lubricating oil fractions of reduced pour point, from hydroisomerized Fischer-Tropsch wax.

DETAILED DESCRIPTION

Ferrierite is classified primarily as a medium pore size material having pore windows of 5.4 Å×4.2 Å (p. 106, Atlas of Zeolite Structure Types, 4$^{th}$ Ed., Elsevier 1996). Natural and synthetic ferrierite comprise a zeolite type of ion exchangeable, crystalline aluminosilicate molecular sieve having both ten and eight ring pore windows, with a silicon to aluminum atomic ratio of about five in natural ferrierite (although this can vary) and a ratio of from about eight to greater than thirty (typically from ten to twenty) in synthetic ferrierite, as is known. The preparation and composition of synthetic ferrierite is well known and discussed, for example, in U.S. Pat. Nos. 4,251,499 and 4,335,019. Both natural and synthetic ferrierite are commercially available in which the cation exchange positions are typically occupied by alkali metal cations, such as Na$^+$, K$^+$ and mixtures thereof. The alkali form is readily converted to the hydrogen form or to a hydrogen precursor form such as the ammonium ion form, for subsequent ion exchange with the desired metal(s), simply by contacting it with an aqueous solution containing ammonium ions which exchange with the alkali metal cations. Calcination of the ammonium form will produce the hydrogen (H$^+$) or acid form, which can also be produced directly by contacting the ferrierite with a suitable material such as hydrochloric acid. While ferrierite both with and without a catalytic metal component is known as a dewaxing catalyst, examples of dewaxing using rare earth ion exchanged ferrierite have not been disclosed. This is not surprising, since the conventional ion exchange technique is ineffective for this purpose. For example, U.S. Pat. Nos. 4,584,286 and 5,288,475 which relate to ZSM-35, both refer to U.S. Pat. Nos. 3,140,249; 3,140,251 and 3,140,253 for conventional ion exchange techniques. The '249, '251 and '253 patents disclose metal ion exchange, including rare earth metal ion exchange, using aqueous salt solutions of the metal or metal and ammonia at atmospheric pressure and a temperature ranging from room temperature to 180° F. However, it has been found that this technique is not effective for ion exchanging rare earth metals with ferrierite. Furthermore, although rare earth metal ion exchange is included among a long list of potential cations, the surprising selectivity towards lube oil fractions resulting from the use of the trivalent rare earth exchanged ferrierite is no where mentioned. For example, using this technique to try to ion exchange lanthanum with ammonium ferrierite from an aqueous solution of lanthanum chloride at 180° F. for 48 hours, followed by washing with water, resulted in a lanthanum content of only 0.31 wt. %. This means that at maximum, only about 5% of the cation exchange capacity was met by trivalent lanthanum cations in cation exchange positions. While not wishing to be held to any particular theory, it is believed that if ion exchange occurred, it may have occurred only on the exterior surface of the ferrierite and not in the pores where it is needed to be catalytically effective. In the practice of the invention, the trivalent rare earth metal or metals are ion exchanged into the ferrierite using a hydrothermal technique in which a hydrogen ferrierite precursor or hydrogen (H+) ferrierite is contacted with an aqueous solution of the desired trivalent rare earth metal or metals, under hydrothermal conditions, which means at a temperature above the normal atmospheric pressure boiling point of the solution. For example, ammonium ferrierite was immersed in a solution of lanthanum chloride in sealed vessel at a temperature of 392° F. (200° C.) for 24 hours and yielded a lanthanum exchanged ferrierite containing 1.97 wt. % La. This means that about 28% of the cation exchange capacity available for trivalent cation exchange was occupied by lanthanum. The time and temperature sufficient to achieve the desired level of exchange is determined experimentally. After ion exchange, the ion exchanged ferrierite may then be washed, dried, calcined and the ion exchange, washing, drying and calcining steps repeated as many times as needed to achieve the desired ion exchange level. As a practical matter, typically a mixture of two or more rare earth metals will be ion exchanged. Illustrative but non-limiting examples include commercially available mixtures of lanthanum, cerium, praseodymium and neodymium as the main rare earth metals in the mix. For catalytic use, the cerium content of the mix is typically depleted.

As mentioned above, the silica to alumina mole ratio or the silicon to aluminum mole ratio of ferrierite will vary. The cation exchange capacity of the ferrierite is determined by the aluminum or alumina content. Each mole of aluminum ions substituted in tetrahedral positions of the zeolite framework generates a mole of negative charge on the framework. This charge is balanced by exchangeable cations. Since rare earth metal (RE) cations are trivalent, each mole of RE ion incorporated via ion exchange replaces three moles of alkali metal, ammonium or hydrogen ions. Therefore, the degree or percent of RE exchange which is a measure of cation exchange positions occupied by the trivalent rare earth cations is more meaningful than the weight percent of rare earth metal incorporated into the ferrierite after ion exchange with solutions containing one or more rare earth metal cations. The RE content, the $SiO_2/Al_2O_3$ mole ratio and the degree of exchange are all related by the expression:

% RE exchange=[3×(moles RE)]/[(moles Al)×100]

These values are determined by any suitable analytical technique (such as elemental analysis) which yields the amount of each element present in the dry RE-ferrierite resulting after exchange and washing with water, to remove all metal that has not been ion exchanged. By way of example, the table below gives examples of the content in wt. % of the rare earth metal La calculated on a dry basis with variation of the $SiO_2/Al_2O_3$ mole ratio in the ferrierite and the % La exchanged. This shows that at high $SiO_2/Al_2O_3$ mole ratios, elemental analysis will show low wt. % La even at substantial degrees of La exchange.

| $SiO_2/Al_2O_3$ | Si/Al | Wt. % La at % La Exchange Shown | | | |
|---|---|---|---|---|---|
| | | 5 | 10 | 20 | 30 |
| 5 | 2.5 | 1.09 | 2.16 | 4.22 | 6.21 |
| 10 | 5 | 0.64 | 1.27 | 2.51 | 3.71 |
| 20 | 10 | 0.35 | 0.70 | 1.38 | 2.06 |
| 50 | 25 | 0.15 | 0.30 | 0.59 | 0.88 |
| 80 | 40 | 0.09 | 0.19 | 0.37 | 0.56 |
| 100 | 50 | 0.08 | 0.15 | 0.30 | 0.45 |

As set forth above, a typical dewaxing catalyst of the invention will comprise RE-ferrierite and also at least one catalytic metal component. The dewaxing catalyst of the invention is a dual function catalyst having both a hydroisomerization and a dehydrogenation/hydrogenation function, with the RE-ferrierite providing the hydroisomerization function and the catalytic metal component the dehydrogenation/hydrogenation function. In one embodiment the catalyst will also contain one or more refractory catalyst support materials, including one or more additional molecular sieve components. The refractory catalytic support material may include, for example, any oxide or mixture of oxides such as silica which is not catalytically acidic, and acid oxides such as silica-alumina, other zeolites, silica-alumina-phosphates, titania, zirconia, vanadia and other Group IIIB, IV, V or VI oxides. The Groups referred to herein refer to Groups as found in the Sargent-Welch Periodic Table of the Elements copyrighted in 1968 by the Sargent-Welch Scientific Company. A catalytic metal component, such as one or more Group VIII metals and preferably at least one noble metal of Group VIII, may be deposited on, ion exchanged into or composited with the RE-ferrierite or it may be supported on one or more refractory catalyst support materials or additional molecular sieve components that have been or will be composited or mixed with the RE-ferrierite. Thus, the catalytic metal, and promoter metal if present, is composited or mixed with, impregnated into, occluded or otherwise added to one or more of the other catalyst components either before or after they are all mixed together and extruded or pilled. In one embodiment it has been found to be effective to ion-exchange the catalytic metal (e.g., preferably a noble metal as Pt or Pd and preferably Pt) into the ferrierite. One or more metal promoter components of Groups VIB and VIIB may be used with the one or more Group VIII metal catalytic components. Typical catalytic dewaxing conditions useful in the process of the invention are set forth in the Table below.

| Condition | Broad | Preferred |
|---|---|---|
| Temperature, ° F. | 300–950 | 400–800 |
| Total pressure, psig | 250–3,000 | 500–1,500 |
| LHSV | 0.1–10 | 0.5–5 |
| Hydrogen treat rate, SCF/B | 500–15,000 | 1,000–3,000 |

An RE-ferrierite dewaxing catalyst of the invention may be used to dewax any waxy hydrocarbonaceous feed, including light and heavy petroleum oils, slack wax, Fischer-Tropsch wax and the like. Prior to being catalytically dewaxed, hydrocarbon feeds derived from petroleum, shale oil, tar sands, and the like will be hydrotreated to remove sulfur and nitrogen compounds, aromatics, and non-aromatic unsaturates. It is preferable to deoil such feeds prior to the hydrotreating to an oil content of from about 0–35 wt. % and preferably 5–25 wt. %. The hydrotreating step is accomplished by reacting the feed with hydrogen in the presence of any well known hydrotreating catalyst at hydrotreating conditions. Such catalysts typically comprise catalytic metal components of Co/Mo, Ni/Mo or Ni/Co/Mo on alumina and are well known to those skilled in the art. Typical conditions include a temperature in the range of from 540–750° F., a space velocity of 0.1 to 2.0 v/v/hr, a pressure of from 500–3,000 psig and hydrogen treat rates of from 500–5,000 SCF/B. Further, if desired the feed may be hydroisomerized prior to catalytic dewaxing.

A dewaxing catalyst comprising the RE-ferrierite of the invention has been found to be particularly effective for producing dewaxed lubricating oil fractions of low pour point with high product yield from Fischer-Tropsch wax that has been hydroisomerized (and hydrotreated if necessary) over a dual function catalyst to produce a heavy boiling feed comprising a mixture of isoparaffins and normal paraffins. When produced via a slurry process from a catalyst which includes a cobalt catalytic component, this Fischer-Tropsch wax feed is very pure, typically having less than 1 vppm of either sulfur or nitrogen and comprising at least 90 wt. % paraffins and even ≧98–99 wt. % paraffins which may also contain very minor amounts (e.g., less than 1 wt. %) of olefins and oxygenates. A waxy feed of this general composition and purity will ordinarily not require treatment prior to hydroisomerization, because any unsaturates and oxygenates which may be present are in such small quantities that they will be consumed in the hydroisomerization without adversely effecting the hydroisomerization catalyst. However, there are other known Fischer-Tropsch hydrocarbon synthesis processes and catalysts which will not produce a waxy feed of this purity and which may, therefore, require hydrotreating prior to hydroisomerization. By Fischer-Tropsch wax is generally meant the product of a Fischer-Tropsch hydrocarbon synthesis process containing $C_{5+}$, preferably $C_{10+}$ and more preferably $C_{20+}$ paraffinic hydrocarbons. In a slurry process, the wax comprises the hydrocarbon liquid withdrawn from the slurry reactor. For example, the Table below shows the fractional make-up (±10 wt. % for each fraction) of hydrocarbons synthesized in a slurry HCS reactor using a catalyst comprising cobalt and rhenium on a titania support.

| Boiling Temperature Ranges, ° F. | Wt. % of Fraction |
|---|---|
| IBP–320 | 13 |
| 320–500 | 23 |
| 500–700 | 19 |
| 700–1050 | 34 |
| 1050+ | 11 |
| Total | 100 |

During hydroisomerization of the waxy, paraffinic feed, some of the heavy feed (e.g., 650° F.+ to 750° F.+, depending on the desired cut point and whether or not dewaxed fuel fractions are also desired, is converted to lower boiling components, with any olefins and oxygenates present being hydrogenated. Fuel fractions are generally dewaxed to reduce their cloud (or haze) and freeze points. Hydroisomerization conditions can vary widely. Broad ranges of temperature and pressure are typically 300–900° F. (149–482° C.) and 0–2500 psig, with preferred ranges of 550–750° F. (288–400° C.) and 300–1200 psig, respectively. Broad ranges of hydrogen treat rates and consumption are 500–5000 SCF/B and 50–500 SCF/B, with preferred ranges of 2000–4000 SCF/B and 50–500 SCF/B, respectively. The hydroisomerization catalyst comprises one or more catalytic metal components supported on an acidic metal oxide support to give the catalyst both a hydrogenation/dehydrogenation function and an acid hydroisomerization function. Illustrative, but non-limiting examples of such catalysts, their preparation and use may be found, for example, in U.S. Pat. Nos. 5,378,348 and 5,660,714. The isomerate is fractionated to separate the lighter 650° F.– to 750° F.– isomerate (depending on the desired cut point) from the heavier lube oil fraction, with the lighter material used for fuel boiling in the naphtha and diesel fuel ranges, if desired. The lube oil fraction is solvent dewaxed or catalytically dewaxed by reacting with hydrogen using the catalyst and process of the invention to further reduce its pour point.

The invention will be further understood with reference to the examples below.

EXAMPLES

Example 1

Ammonium ion exchange of alkali metal ferrierite was performed by suspending 100 g of Na-ferrierite having a silicon to aluminum ratio of 8.4 in 500 ml of a 5 wt. % aqueous $NH_4Cl$ solution. The mixture was stirred for several hours at 50° C., filtered, and washed with distilled and deionized water. The exchange was repeated twice and the resulting $NH_4$-ferrierite was dried at 70° C. in a vacuum oven. Lanthanum ion exchange with the $NH_4$-ferrierite was achieved by sealing 7 g of $NH_4$-ferrierite and 40 ml of a 0.2 M aqueous solution of $LaCl_3$ in a Teflon lined stainless steel pressure vessel, followed by heating at 200° C. for 24 hours with occasional shaking. The vessel was quenched with cold water and opened immediately. The solid was filtered, washed with hot distilled and deionized water until chloride free according to an $AgNO_3$ test and then dried at 70° C. in a vacuum oven. Elemental analysis of the $NH_4$-ferrierite and the La-ferrierite gave Si/Al atomic ratios of 8.1 in both cases. The La-ferrierite contained 1.86 wt. % La, indicating 27% of the available cation exchange positions were occupied by the lanthanum. Refinement of X-ray powder diffraction data gave orthorhombic cell constants of 18.84, 14.10 and 7.43 Å for the $NH_4$-ferrierite and 18.94, 14.12 and 7.45 Å for the La-ferrierite. The BET surface area of the $NH_4$-ferrierite was 288 $m^2/g$ and that of the La-ferrierite was 320 $m^2/g$.

Comparative Example A

A 0.4 g sample of the $NH_4$-ferrierite prepared in Example 1 was mixed with 2.4 g of a 5 wt. % aqueous solution of $LaCl_3$ in a capped vial and heated to 180° F. for 48 hours with occasional shaking. The resulting material was separated from the solution by filtration, washed with distilled and deionized water until chloride-free by an $AgNO_3$ test and then dried in a vacuum oven at 70° C. Elemental analysis revealed a lanthanum content of only 0.31%, indicating that only about 5% of the available cation exchange positions may have been occupied by lanthanum.

Example 2

Dewaxing catalysts were prepared by adding 0.5 wt. % platinum to both the $NH_4$-ferrierite and the La-ferrierite prepared in Example 1. The Pt was added by ion exchange with the remaining ammonium sites on the ferrierite using Pt(NH$_3$)$_4$(OH)$_2$. These platinum loaded materials were then calcined in air at 400° C., pilled, crushed and screened to 14/35 Tyler mesh size. Elemental analysis revealed Pt contents of 0.57 and 0.54 wt. %, respectively.

Comparative Example B

An additional catalyst for comparative purposes was prepared by impregnation and extrusion comprising 0.5 wt. % Pt supported on a mixture of 80 wt. % mordenite and 20 wt. % alumina which was calcined in air at 400° C.

Example 3

A hydrocarbon synthesis gas comprising a mixture of H$_2$ and CO having a mole ratio of between 2.11–2.16 was reacted in a slurry comprising bubbles of the synthesis gas and particles of a Fischer-Tropsch hydrocarbon synthesis catalyst comprising cobalt and rhenium supported on titania in a hydrocarbon slurry liquid containing the particulate catalyst and bubbles of the synthesis gas. The hydrocarbon slurry liquid comprised hydrocarbon products of the synthesis reaction which were liquid at the reaction conditions. The reaction conditions included a temperature of 425° F., a pressure of 290 psig and a gas feed linear velocity of from 12 to 18 cm/sec. The alpha of the synthesis step was 0.92. A 700° F.+ boiling fraction was separated from the hydrocarbon product by flash distillation.

Example 4

The synthesized, 700° F.+ boiling hydrocarbon fraction from Example 3 comprised at least about 98 wt. % paraffins. This material was hydroisomerized by reacting it with hydrogen in the presence of a dual function hydroisomerization catalyst consisting of cobalt and molybdenum impregnated on an amorphous silica-alumina support. The reaction and reaction conditions were adjusted to achieve 50 wt. % conversion of the 700° F+ material to lower boiling material and included a temperature of 700° F., a space velocity of 0.45 v/v/hr, a pressure of 1000 psig and a hydrogen treat rate of 2500 SCF/B. The resulting isomerate was fractionated to recover the 700° F.+ boiling fraction which comprised a mixture of normal paraffins and isoparaffins and had a pour point of 2° C.

Example 5

The dewaxing activity and selectivity of the three different catalysts prepared in Example 2 and in Comparative Example B was evaluated by reacting separate portions of the 700° F.+ isomerate fraction of Example 4 with hydrogen in the presence of each catalyst using an upflow, ⅜ inch fixed bed reactor at reaction conditions of 750 psig, 2.0 w/h/w and a hydrogen treat rate of 2500 SCF/B. The reaction temperature varied and was adjusted to achieve the same comparable lube product pour point for each catalyst. The results of these evaluations in terms of products and properties are shown in the Table below.

|  | Pt/NH$_4$-ferrierite | Pt/La-ferrierite | Pt/H-mordenite-alumina |
| --- | --- | --- | --- |
| Reactor Temp., ° F. | 635 | 635 | 518 |
| Gas (C$_1$—C$_4$) | 2.8 | 1.9 | — |
| Naphtha (C$_5$—320° F.) | 3.4 | 1.7 | — |
| Diesel (320–700° F.) | 16.5 | 12.6 | — |
| Lubes (700° F.+) | 78.3 | 84.5 | 59.4 |
| Lubes Pour Point, ° C. | −32 | −31 | −30 |
| Lubes VI | 142 | 144 | 145 |

As these data show, the Pt/La-ferrierite catalyst was more selective towards producing the dewaxed 700° F.+ boiling lubes product than the Pt/NH$_4$-ferrierite, with less gas make and higher lube yield at equivalent pour point. The Pt-mordenite catalyst produced significantly less 700° F.+ material, with substantially more gas make than the Pt/La-ferrierite catalyst of the invention.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A cation exchanged ferrierite having at least 10% of its cation exchanged capacity occupied by one or more trivalent rare earth metal cations.

2. Ferrierite according to claim 1 in which at least 15% of its cation exchange capacity is occupied by one or more rare earth metal cations.

3. Ferrierite according to claim 2 in which at least 25% of its cation exchange capacity is occupied by one or more trivalent rare earth metal cations.

4. A catalyst comprising at least one catalytic metal component and a cation exchanged ferrierite in which at least 10% of its cation exchange capacity is occupied by one or more trivalent rare earth metal cations.

5. A catalyst according to claim 4 in which said one or more cations occupy at least 15% of said cation exchange capacity.

6. A catalyst according to claim 5 in which said one or more cations occupy at least 25% of said cation exchange capacity.

7. A catalyst according to claim 6 containing a Group VIII catalytic metal component.

8. A catalyst according to claim 6 containing a Group VIII noble metal catalytic component.

9. A method for adding one or more trivalent rare earth metal cations to ferrierite by ion exchange which comprises contacting ferrierite with an aqueous solution of a salt of said one or more rare earth metals under hydrothermal conditions, at a temperature above the normal boiling point of said solution, to produce a cation exchanged ferrierite in which at least 10% of its cation exchange capacity is occupied by said at least one or more rare earth metal cations.

10. A method according to claim 9 wherein the cation exchange positions of said ferrierite are occupied by hydrogen or a hydrogen ion precurser prior to contacting with said rare earth metal solution.

\* \* \* \* \*